United States Patent
Hymus

(10) Patent No.: US 7,686,954 B2
(45) Date of Patent: Mar. 30, 2010

(54) DEVICE FOR TREATING A FLOWING LIQUID

(75) Inventor: Paul Hymus, Tyne & Wear (GB)

(73) Assignee: Parker Hannifin Limited, Hemel Hempstead (GB)

( * ) Notice: Subject to any disclaimer, the term of this patent is extended or adjusted under 35 U.S.C. 154(b) by 302 days.

(21) Appl. No.: 11/677,060

(22) Filed: Feb. 21, 2007

(65) Prior Publication Data
US 2007/0272624 A1 Nov. 29, 2007

Related U.S. Application Data

(63) Continuation of application No. PCT/GB2005/003424, filed on Sep. 7, 2005.

(30) Foreign Application Priority Data
Sep. 15, 2004 (GB) .................................. 0421522.4

(51) Int. Cl.
B01D 27/08 (2006.01)
B01D 27/10 (2006.01)
B01D 35/14 (2006.01)
B01D 35/30 (2006.01)
B01D 35/31 (2006.01)
B01D 35/34 (2006.01)

(52) U.S. Cl. ...................... 210/232; 210/449; 210/460; 210/767

(58) Field of Classification Search ................ 210/232, 210/449, 460, 767
See application file for complete search history.

(56) References Cited

U.S. PATENT DOCUMENTS

| | | | |
|---|---|---|---|
| 234,494 A | | 8/1880 | McCauley et al. |
| 649,082 A | * | 5/1900 | Stahle ........................ 210/287 |
| 2,334,802 A | * | 11/1943 | Zuckermann ............... 210/335 |
| 2,690,930 A | * | 10/1954 | Corson ........................ 239/316 |

(Continued)

FOREIGN PATENT DOCUMENTS

GB 473925 10/1937

(Continued)

OTHER PUBLICATIONS

International Search Report and Written Opinion in corresponding International Application No. PCT/GB05/003424.

(Continued)

*Primary Examiner*—Thomas M Lithgow
(74) *Attorney, Agent, or Firm*—Christopher H. Hunter

(57) ABSTRACT

A device for treating a flowing liquid comprises a chamber containing a treatment medium, having an inlet through which liquid enters the chamber and an outlet through which liquid leaves the chamber. A plate is provided in the outlet, having at least one opening extending through it positioned such that liquid passing out of the chamber passes through the opening for discharge from the device. The outlet includes a skirt located downstream of the plate so that the plate is recessed from the outlet end of the device defined by the edge of the skirt, and a peelable protective cover which is attached to the edge of the skirt at the outlet end of the device to prevent ingress of contaminants into the device at its outlet end.

6 Claims, 2 Drawing Sheets

U.S. PATENT DOCUMENTS

| | | | |
|---|---|---|---|
| 2,801,751 A | | 8/1957 | Thomas |
| 4,288,325 A | * | 9/1981 | Lieberman .................. 210/449 |
| 4,382,862 A | * | 5/1983 | Dillman ...................... 210/668 |
| 4,441,996 A | | 4/1984 | Hurst |
| 4,516,994 A | | 5/1985 | Kocher |
| 4,895,651 A | | 1/1990 | Niddleton |
| 4,990,449 A | * | 2/1991 | Caissel ....................... 435/174 |
| 6,416,563 B1 | | 7/2002 | Wright et al. |

FOREIGN PATENT DOCUMENTS

| | | |
|---|---|---|
| GB | 2196329 A1 | 4/1988 |
| GB | 2233246 A1 | 1/1991 |
| JP | 5277468 | 10/1993 |
| JP | 10024297 | 1/1998 |
| WO | 9817582 A1 | 4/1998 |
| WO | 9857726 A1 | 12/1998 |
| WO | 02102722 A1 | 12/2002 |

OTHER PUBLICATIONS

Search Report under Section 17 in corresponding Great Britain Application No. GB0421522.4.

* cited by examiner

DEVICE FOR TREATING A FLOWING LIQUID

CROSS REFERENCE TO RELATED APPLICATIONS

This application is continuation of copending International Application No. PCT/GB05/003424 filed Sep. 7, 2004, which designated the United States, the disclosure of which is incorporated herein by reference, and which claims priority to Great Britain Patent Application 0421511.4, filed Sep. 15, 2004.

BACKGROUND OF THE INVENTION

The present invention relates to a device for treating a flowing liquid.

In hospitals and other applications where hygienic conditions are important, there is a need for a device which will provide a treated water source. A treated water source in the context of this document should be taken to mean a source which provides water with an acceptable level of contaminants e.g. micro-organisms. A means of attaining this level could be a filter material with a suitable pore size or a chemical treatment or ion-exchange material.

One method of providing a treated water source is to attach a device which contains a treatment method such as a filter to an untreated water source such as a mains water tap. The water from the outlet of this device can then be used for applications where treated water is required. Some examples of the many situations where treated water is required are; for medical staff to prepare themselves before performing an operation, for the treatment of immunocompromised patients, for food preparation and for personal hygiene. It can also be required for cleaning medical equipment.

Liquid treatment devices for providing a source of treated water are known. One example of such a device is fitted to a tap by a connector and contains a filter and an outlet to provide a source of treated water. After it has been assembled, the device is placed in a suitable packaging, sealed to provide a microbiological barrier and sterilised so that the device is sterile whilst it being transported and stored. When ready for use, the sterile packaging is opened and the device is taken out and placed on the tap via the connector and then used.

SUMMARY OF THE INVENTION

According to one aspect, the present invention provides a device for treating a flowing liquid comprising;

a chamber containing a treatment medium, an inlet through which liquid enters the chamber, an outlet through which liquid can leave the chamber in which a plate is provided, the plate having at least one opening extending through it positioned such that liquid passing out of the chamber passes through the opening for discharge from the device;

in which the outlet includes a skirt located downstream of the plate so that the plate is recessed from the outlet end of the device defined by the edge of the skirt and a peelable protective cover which is attached to the edge of the skirt at the outlet end of the device to prevent ingress of contaminants into the device at its outlet end.

The skirt component of the device can provide a physical barrier that inhibits users of the device from touching the outlet plate. Any contact of a foreign object, e.g. a user's hand or other object being washed, or a splash of water from a foreign object, with a part of the device which is in direct contact with the water after it has been treated is a potential cause of contamination of the treated water discharged from the device. Therefore the skirt provides a significant advantage in reducing the likelihood of contamination of the treated water.

The presence of a peelable protective cover which is attached to the edge of the skirt at the outlet end of the device can help to prevent ingress of contaminants into the device at its outlet end. It is the outlet end of the device that is most important to protect from contamination. A suitable peelable protective cover should be made of a suitable material that will act as a barrier to all contaminants and that is bonded to the device in such a way that the bond is proof against contaminants while the cover can be removed by hand without undue effort. For example, the cover can comprise a heat stabilised polypropylene polymer laminate and a metal layer. The metal layer can be heated by exposure to a suitable source of electromagnetic radiation and the heated metal layer then melts the polymer and allows it to bond to the device. Other materials suitable for the cover include polymer films such as polyester, polypropylene and polyethylene, paper fibres and plastic fibres. Other bonding methods include adhesives or other methods of heat sealing such as thermal bonding, where an external heat source is applied to the cover. In addition bonding by heat generated through friction can be achieved using, for instance, an ultrasound generator to cause the surfaces to be bonded to vibrate together and produce heat. An advantage of a peelable protective cover attached to the edge of the skirt of the device is that the device does not need to be totally enveloped in sterilised packaging before use.

The device can include a cover on the inlet to minimise ingress of contaminants into the device at the inlet. The cover on the inlet can be in the form of a press fit cap, which fits over the inlet. A cap can be held in place on the inlet by frictional forces. A cap can be held in place on the inlet by means of a bonding material. The cover on the inlet can be in the form of a peelable protective cover, having characteristics which are common to the cover on the edge of the skirt at the outlet end of the device.

The device is manufactured and then sterilised by irradiation (including by gamma radiation source or by electron beam), autoclave or by treatment with chemicals e.g. ethylene oxide. Treatment by chemicals requires gas permeable packaging. For autoclave sterilisation the packaging has to be permeable to steam. Once the device is sterilised, the inside of the device will remain sealed until the peelable protective cover is removed. This can reduce the requirement for packaging to maintain required sterilisation or other hygiene conditions during transportation and storage of the device, prior to installation for use. The cover on the outlet end of the device also allows hygiene conditions of the device to be maintained after it has been installed, until the device is to be used.

Preferably the strength of the bond created between the peelable protective cover and the edge of the skirt is lower than the tear strength of the cover itself. A bond such as this means that the cover will detach completely from the skirt in one piece when removed. This is advantageous as it reduced the amount of handling required to prepare the device for use and consequently reduces the chances of contamination.

If an adhesive is used to make the bond between the peelable protective cover and the edge of the skirt, it is preferable that the adhesive attaches preferentially to the cover rather than the edge of the skirt. This allows all the adhesive to remain with the cover when the cover is removed and prevents any residue from being left on the edge of the skirt. Any residue left on the skirt would provide a potential contamination site and so it is advantageous to ensure that no residue is left on the skirt.

Preferably, the device of the present invention comprises a skirt wherein the ratio of the depth of the skirt to the width of the outlet is at least 0.1. Particularly preferably, the ratio of the depth of the skirt to the width of the outlet is at least 0.15. Especially preferably, the ratio of the depth of the skirt to the width of the outlet is at least 0.2. The width of the outlet will be its diameter when the outlet is circular. This ratio range has the advantage that it will provide a suitably sized physical barrier to prevent contact between a foreign object and a treated water contacting part of the device (see above). Preferably, the ratio of the depth of the skirt to the width of the outlet not more than 1. Particularly preferably, the ratio of the depth of the skirt to the width of the outlet is not more than 0.7. Especially preferably, the ratio of the depth of the skirt to the width of the outlet is not more than 0.5.

Preferably, the device of the present invention comprises a plate comprised of a plurality of openings that provide a dispersed spray when liquid passes through them.

Particularly preferably, the plurality of openings are such that the spray produced is divergent.

Preferably, the device of the present invention comprises a chamber which contains a filter medium.

In a further aspect the present invention provides a method for providing a treated liquid delivery system comprising the steps of; fitting a device as claimed in claim 1 to a liquid source via a suitable connector and removing the peelable protective cover from the device.

In a yet further aspect the present invention provides a treated liquid delivery system comprising; a pipe connected to a liquid source and a device as claimed in claim 1 connected to the pipe.

The peelable protective cover can comprise a plurality of layers of one or more materials, for example in a laminate. The cover can comprise one or more layers in the form of a polymeric film, a metal foil, paper and other cellulosic sheet materials (with or without polymeric or other coating), non-woven polymeric sheets. Examples of polymeric materials which can be used in the cover include polyolefins, especially polyethylene and polypropylene, polyesters, polyamides, polysulphones. Polymers can be treated to optimise their properties for use in the cover, for example by crosslinking to optimise their characteristics when exposed to heat. For example a polymer layer might be relied on to form a bond between the cover and the edge of the skirt, for example as a result of softening when exposed to heat. Other polymer layers might be treated so as to reduce their tendency to soften when exposed to heat, for example by crosslinking.

The protective cover can be reinforced to improve resistance to tearing, for example by means of a metal foil or by means of fibres. For example a reinforcing component can be included between two polymer film layers.

The use of a metal foil in the cover has the advantage that the cover can be heated by exposure to appropriate electromagnetic radiation, for example by inductive heating. This can be relied on to cause an increase in temperature such that a polymeric layer of the cover softens.

The connector supplied with the device for attaching the inlet of the device to a tap can be of a standard type eg. a connector supplied from Walther GmbH & Co, Coupleurs Gromelle or Colder Products Company or a suitable threaded connection. A bayonet connection can also be used.

The body of the device can be made from suitable materials including, but not limited to, polyamides, polyethylenes, polypropylenes, polyesters, polysulphones or and other polymers which are capable of being produced in Medical Grade. The device can be produced by a number of forming methods including injection moulding, blow moulding, rotational moulding, machining from solid or casting.

If a filter is present in the device, suitable materials for the filter depend on the level of organism clearance required i.e. the maximum size of organism that is considered as non-contaminating. The filter should be constructed to trap any organisms or particles over this size. A typical suitable filter pore size is $0.2 \text{ H } 10^{-6}$ m i.e. 0.2 µm. Suitable materials with this pore size are polymeric membranes with suitable supporting materials. The materials are typically multi layered with each layer performing a different function such as pre-filtration, sterilising, and drainage.

Other possible filter media types could be metal based membranes, organic, inorganic or metallic fibre based, granular based, extruded porous structures or beads.

Materials used in the device of the invention can include additives to optimise characteristics for example for processing by moulding techniques, for sterilisation by exposure to high temperature and/or pressure. Additives can be included to optimise bactericidal and aesthetic (for example colour) characteristics.

BRIEF DESCRIPTION OF THE DRAWINGS

Embodiments of the invention will now be described, by way of example only, and with reference to the accompanying drawings, in which.

DETAILED DESCRIPTION OF THE PRFERRED EMBODIMENT

Figure 1:
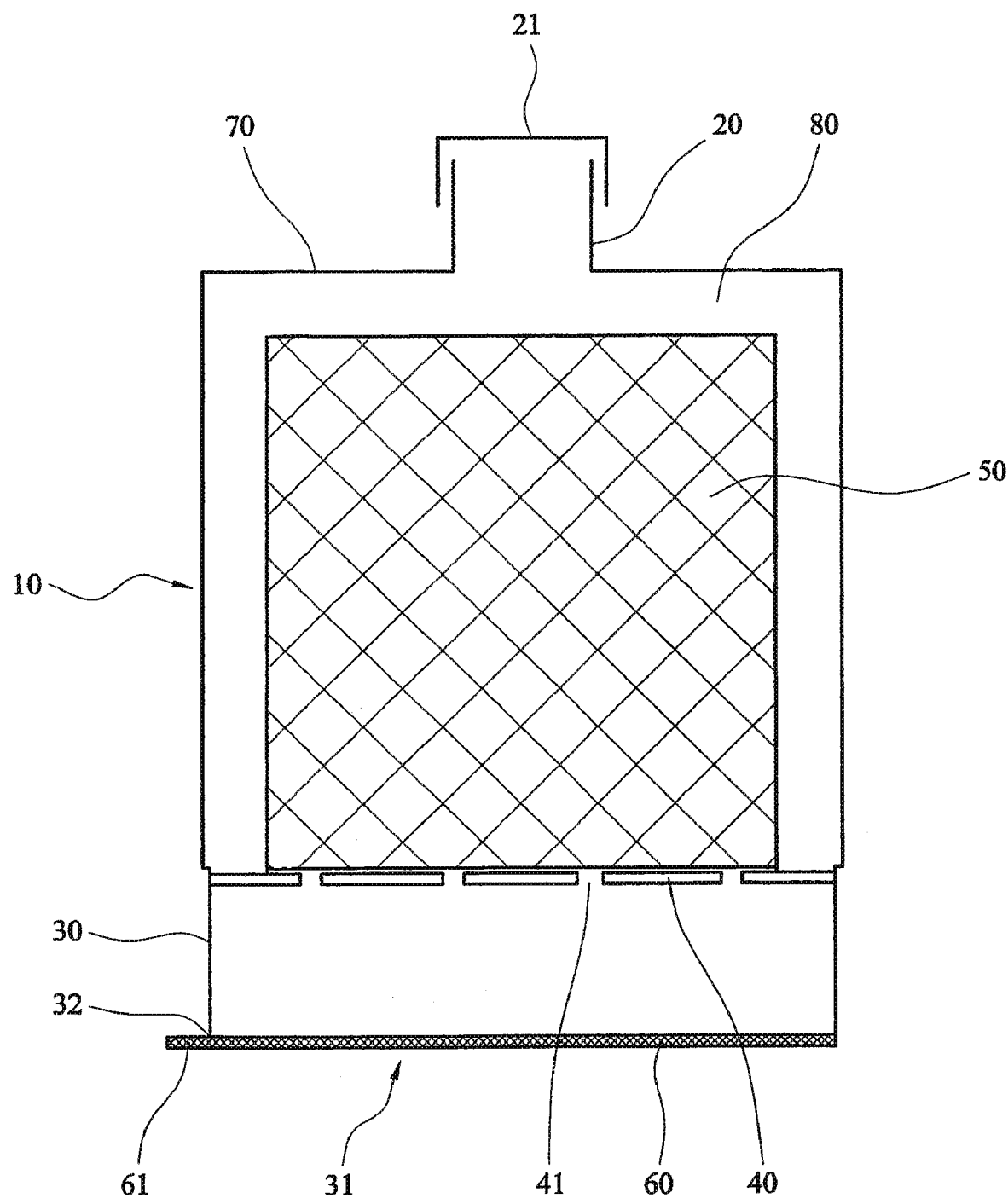
FIG. 1 is a cross section of an elevation view of a device according to the present invention.
Figure 2:
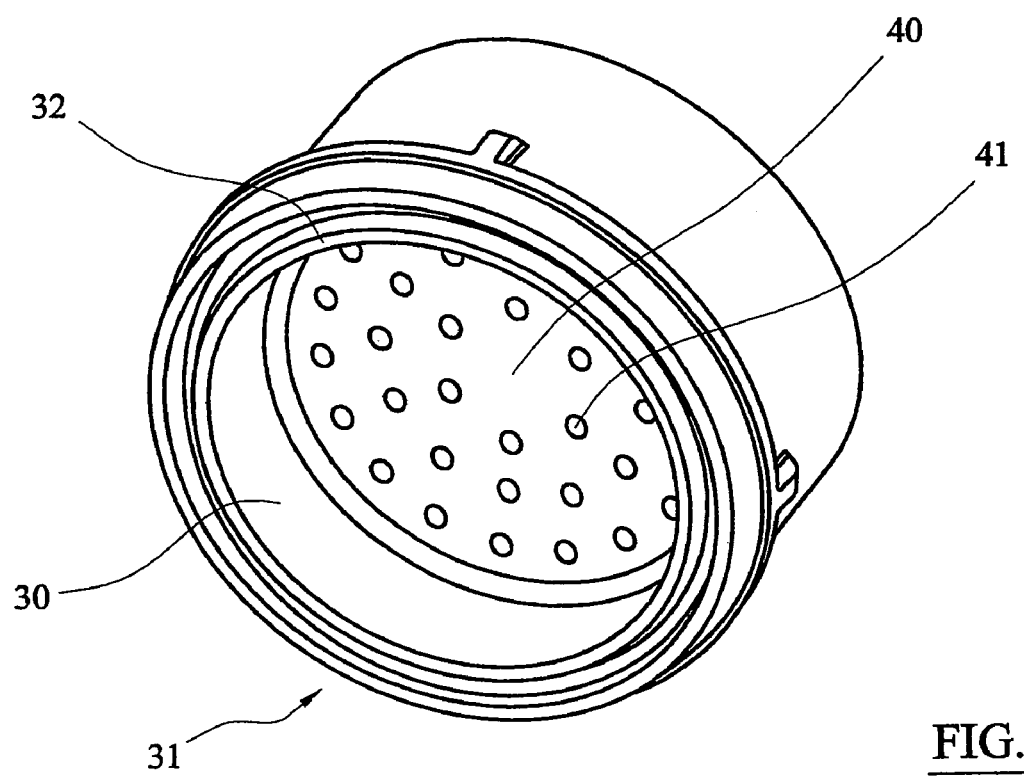
FIG. 2 is an isometric view of the outlet of the device shown in FIG. 1.

Referring to the drawings, FIGS. 1 and 2 show a device (10) for treating a flowing liquid which comprises an end cap (21) to cover an inlet (20) which is attached to the main body (70) of the device (10). The device is made of polypropylene by injection moulding. The main body of the device defines an interior space or chamber (80) which contains suitable treatment material (50). In this embodiment the treatment material is a filtration medium based on a polymeric membrane with a filter pore size of 0.2 µm.

The filtration medium is provided as a cylindrical cartridge having a hollow space within it, which is arranged for the liquid to flow through its wall as it flows through the device between the inlet and the outlet. Generally, the medium is arranged for the liquid to flow inwardly through the wall, that is in an out-to-in sense.

An outlet plate (40) is attached to the downstream end of the main body (70) of the device. This outlet plate (40) is surrounded by a skirt (30) such that the outlet plate (40) is recessed from the outlet end (31) of the device (10) by the presence of the skirt (30). In the present embodiment a plurality of holes (41) are provided in the outlet plate to allow water to exit the main chamber (80) of the device (10).

As shown in FIG. 2, the outlet plate (40) is recessed from the outlet end (31) by the presence of the skirt (30). A peelable protective cover (60) not shown in FIG. 2 but shown in FIG. 1 seals the outlet end (31) of the device by being bonded across the entirety of the edge (32) of the skirt (30). The peelable protective cover (60) comprises a laminate of one or more polymer layers and at least one layer of a metallic film. A polymer material can provide a bonding layer, by which the cover is bonded to the outlet end of the skirt. The metal layer can be heated by electromagnetic radiation which in turn heats the bonding layer to a temperature at which it softens so that it can form a bond to the edge of the skirt (32). The peelable protective cover (60) has a handle (61) in the form of a protruding tab at the edge of the cover which can be gripped to facilitate removal of the cover from the device (10). This handle (61) is formed integrally with the peelable protective cover. The internal space of the device defined by the space sealed by the peelable protective cover (60) and the end cap (21) is sterilised after manufacture and will remain sterile under the peelable protective cover (60) is removed.

Figure 3:
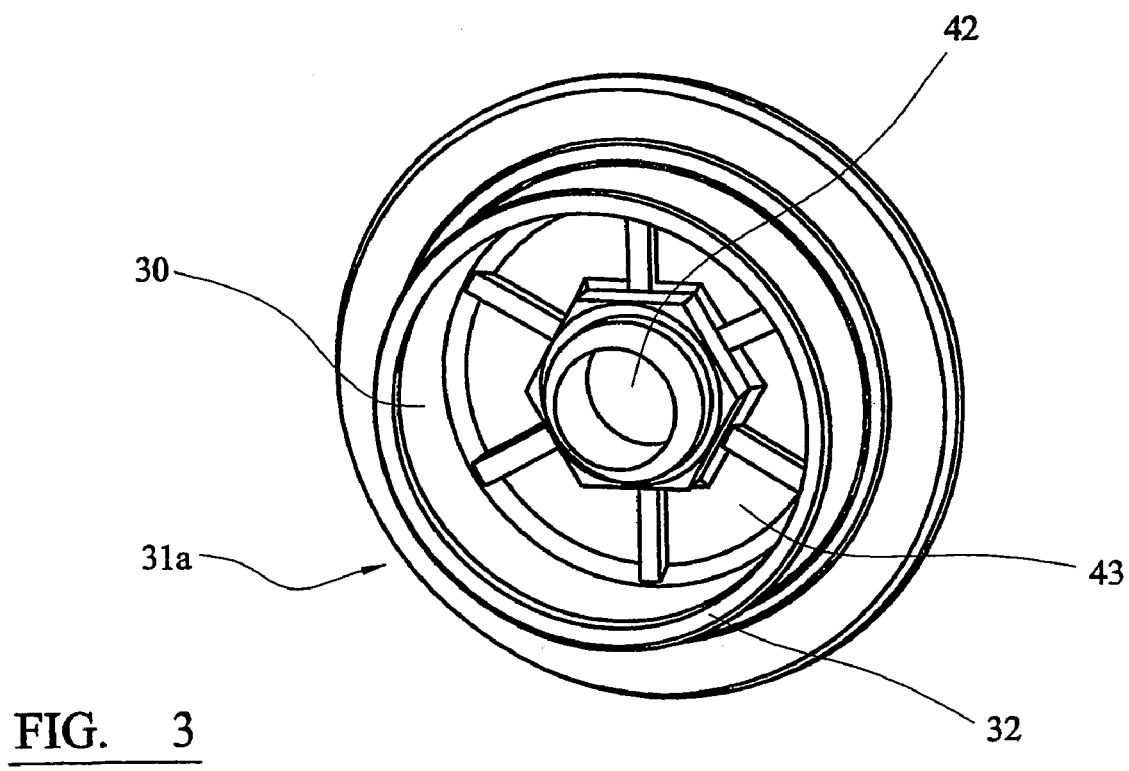
FIG. 3 is an isometric view of an outlet of another embodiment of a device according to the present invention.

FIG. 3 shows an outlet end (31*a*) of another embodiment of the device. This outlet end (31*a*) can be fitted on to the main body (70) of the device, instead of the outlet end (31) shown in FIG. 1, during manufacture of the device (10). This outlet end (31*a*) has one opening (42) in the outlet plate (43) which produces a single jet of water. The skirt (30) is similar to that of the outlet end (31) shown in FIG. 1 and the peelable protective cover (60) fits on the edge of the skirt (32) in the same way.

In use, the device is removed from its packaging and the end cap (21) is removed from the inlet (20) of the device. The inlet of the device is attached to a tap via an integral connector. Once the device has been attached to the tap, the peelable protection cover (60) is removed from the device. The device is then ready for use.

What is claimed is:

1. A device for treating a flowing liquid comprising;
    a chamber containing a treatment medium,
    an inlet through which liquid enters the chamber,
    an outlet through which liquid can leave the chamber in which a plate is provided, the outlet having a dimension sufficient that a user could come into direct physical contact with the plate through the outlet during use, the plate having at least one opening extending through it positioned such that liquid passing out of the chamber passes through the opening for discharge from the device;
    in which the outlet includes a skin located downstream of the plate which surrounds the plate so that the plate is recessed from the outlet end of the device defined by the edge of the skirt, and the skirt has a geometry defining an unconstrained flow path from the plate to the outlet end of the device, the ratio of i) the depth of the skirt from the plate to the outlet end of the device to ii) the width of the outlet, being at least 0.2, and
    a peelable protective cover which is attached to the edge of the skirt at the outlet end of the device to prevent ingress of contaminants into the device at its outlet end.

2. A device as claimed in claim 1 wherein the plate comprises a plurality of openings that provide a dispersed spray when liquid passes through them.

3. A device as claimed in claim 2 wherein the plurality of openings are such that the spray produced is divergent.

4. A device as claimed in claim 1 wherein the chamber contains a filter medium.

5. A method for providing a treated liquid delivery system comprising the steps of;
    a. fitting a device as claimed in claim 1 to a liquid source via a suitable connector and
    b. removing the peelable protective cover from the device.

6. A treated liquid delivery system comprising;
    a. a pipe connected to a liquid source and
    b. a device as claimed in claim 1 connected to the pipe.

\* \* \* \* \*